Feb. 27, 1945.  A. RAMBOLD  2,370,191
FILLING AND MEASURING APPARATUS
Filed April 8, 1941   3 Sheets-Sheet 1
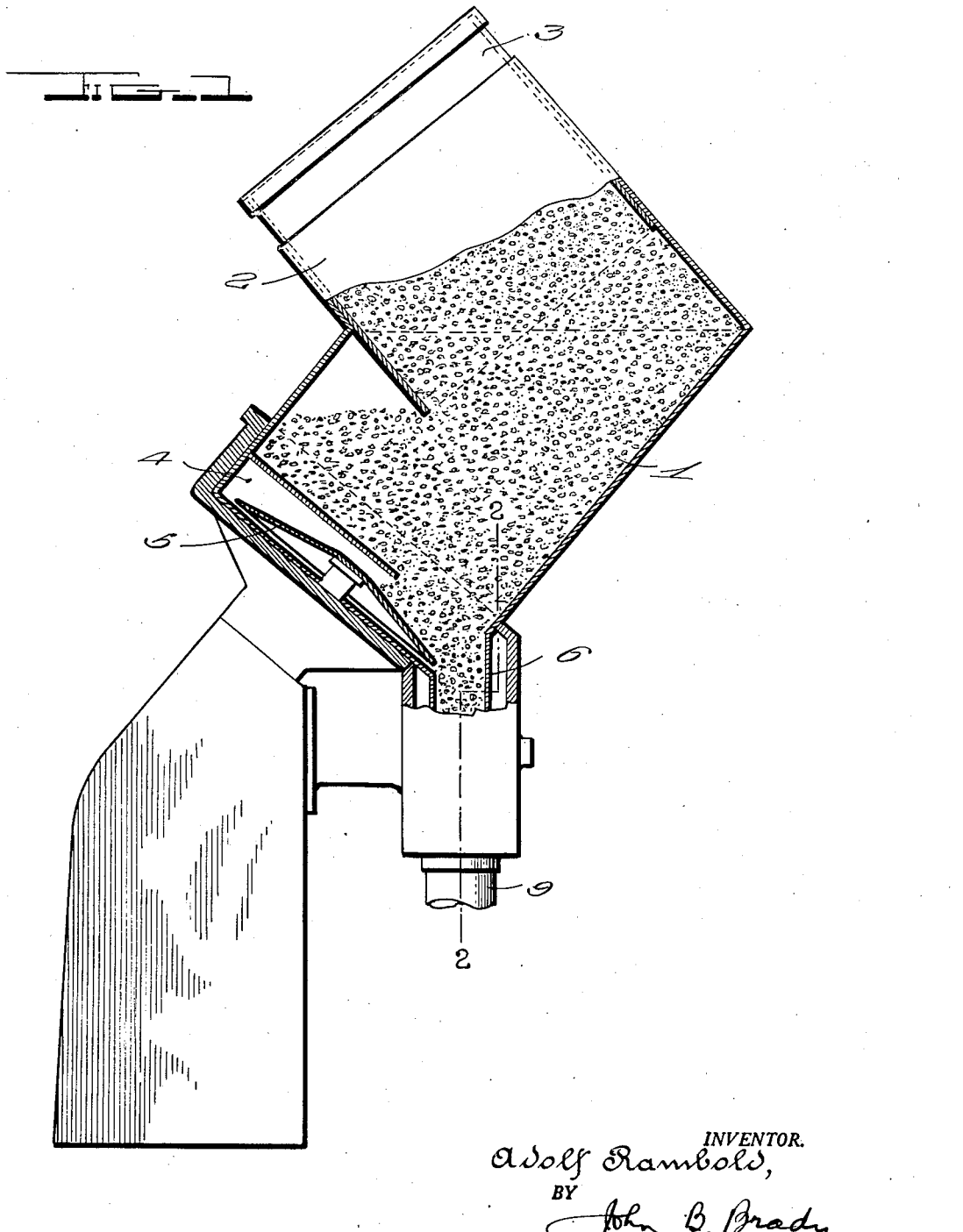
INVENTOR.
Adolf Rambold,
BY
John B. Brady
ATTORNEY Feb. 27, 1945.   A. RAMBOLD   2,370,191
FILLING AND MEASURING APPARATUS
Filed April 8, 1941   3 Sheets-Sheet 2
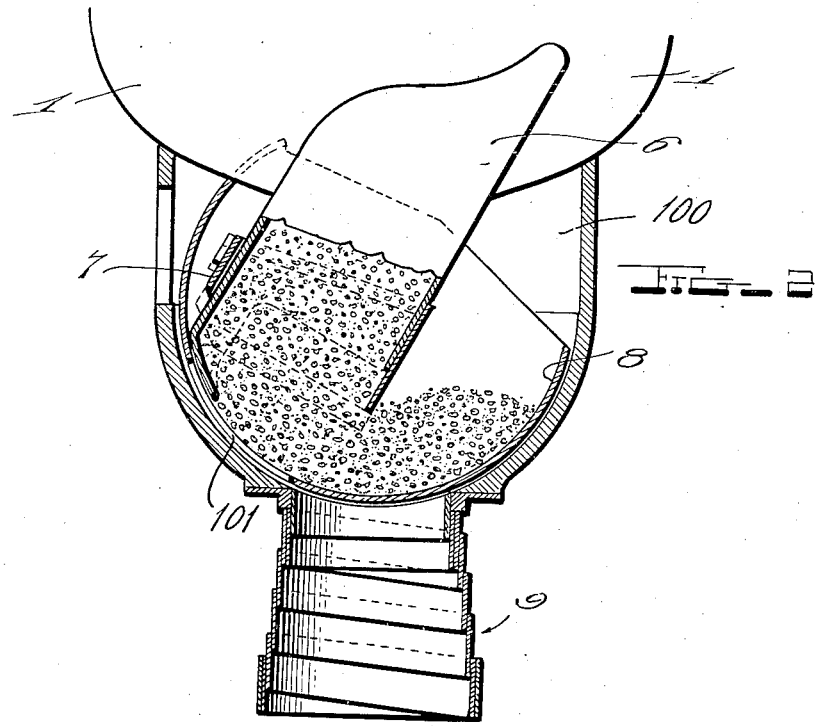
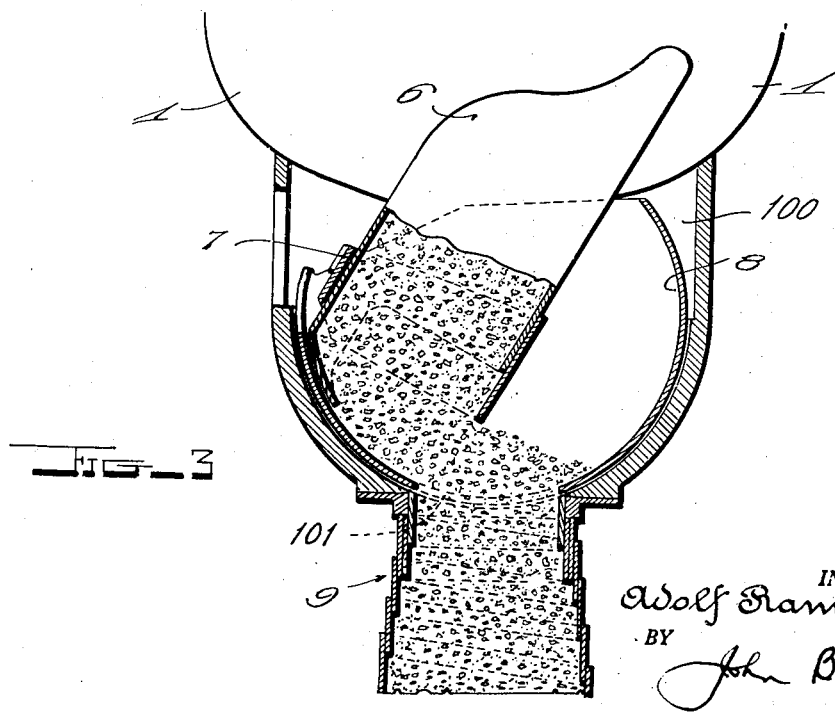
INVENTOR.
Adolf Rambold,
BY
John B. Brady
ATTORNEY Feb. 27, 1945.  A. RAMBOLD  2,370,191
FILLING AND MEASURING APPARATUS
Filed April 8, 1941    3 Sheets-Sheet 3
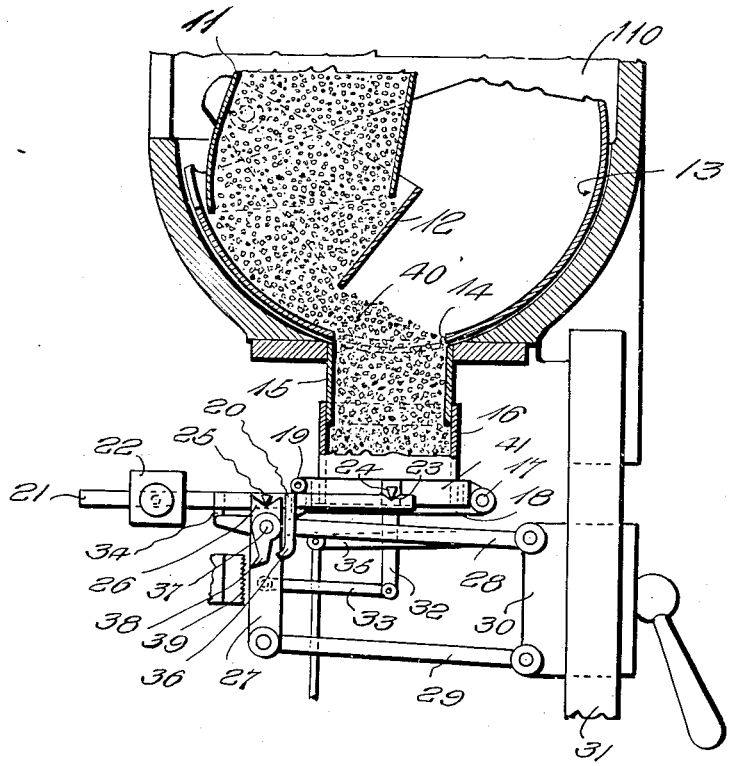
INVENTOR.
Adolf Rambold,
BY
John B. Brady
ATTORNEY Patented Feb. 27, 1945

2,370,191

UNITED STATES PATENT OFFICE 2,370,191

FILLING AND MEASURING APPARATUS

Adolf Rambold, Dresden, Germany; vested in the Alien Property Custodian

Application April 8, 1941, Serial No. 387,502
In Germany May 5, 1940

8 Claims. (Cl. 249—2)

The present invention relates to a device for filling and measuring and has reference to a device which includes a weighing scale or balance. In particular, the invention concerns a device which is especially adapted for filling and measuring loose or spready and poorly flowing materials.

In the case of materials that do not flow readily, known devices with the commonly used conical hoppers have generally required an agitator or an agitating worm. These agitators have the disadvantage, however, of pressing the material through the opening of the hopper with unequal pressure, i. e., the material flows through this opening in uneven quantities so that the quantity of material contained in the space from which the material is transferred to the measuring box is never constant. This unfavorably affects the accuracy of the weight of the material in the measuring box. In addition, delicate materials such as medicinal herbs, etc., are likely to be badly damaged in prior art devices of the type just mentioned.

The present invention eliminates these disadvantages by means of the fact that the hopper is composed of two cylinders set at an angle to each other and arranged consecutively. This arrangement affords smooth, uninterrupted downward flowing of the material as the result of its own weight. The slanting position of the cylinders effects smooth sliding of the material down to the bottom of the lower cylinder part. By means of an oscillating disc, the material on the bottom of the lower cylinder part is agitated just sufficiently to permit it to flow evenly through the outlet branch into a pre-filling chamber. As soon as this outlet branch and the pre-filling chamber are filled, the oscillating smooth disc becomes ineffective so that it is not possible for the material to be pressed into the pre-filling chamber too heavily or unevenly.

A further important feature of the invention is the outlet branch, which is staggered with respect to a measuring box, and a sliding or swinging throttle valve arranged thereon. As the result of this arrangement, only so much material is deposited in the measuring box as can be accommodated by the opening of the outlet branch. The opening itself can be regulated by means of the sliding or swinging throttle valve. By means of this arrangement, a constantly uniform pressure can be maintained above the measuring box, which is essential for accurate weight.

One important object of the invention is to provide a device for filling and measuring which is able to handle any type of material, in particular large leafed and loose or spready products such as, for instance, medicinal herbs. It is especially important that an agitator or similar acting means be avoided in order to prevent damage to delicate products and also to achieve a uniform weight.

This problem is solved in the following manner:

(1) A sufficiently large capacity being provided, the weight of the quantity of material to be filled is distributed in two halves by means of the cylinders being set at an angle, so that it is not possible for too large a pressure to develop on the bottom of the lower cylinder.

(2) In addition to the distribution of weight, the angular relation of the two cylinders ensures smooth downward gliding of the material to be filled and promotes the centrifugal action of the oscillating disc.

(3) The outlet branch is placed at the point to which the material to be filled slides most readily after being acted upon by the oscillating disc.

(4) The oscillating disc is entirely smooth and without interruptions so that the material to be filled cannot be damaged and it suffices if the outlet branch is loosely filled with the product in order to neutralize the effect of the oscillating disc so that the flow of material can be guided loosely and without pressure over and into the measuring box.

(5) As the result of staggering the outlet branch in relation to the vertical measuring box, the material contained in the branch does not press directly on the measuring box.

(6) In order to be able to regulate the exact amount of material which may be present above the measuring box, in accordance with the product to be measured and the amount, the sleeve or throttle valve is provided in order to increase or reduce the size of the side outlet of the branch.

A further feature of the invention consists in forming the measuring box of a flexible band, which is adjustable as to diameter and depth. A very high degree of adjustability is thus achieved so that several weights may be adjusted with one measuring box. In addition, in the case of a product which clumps together easily, it is possible to increase the diameter of the measuring box during the opening of the same so that the product can drop through without hindrance.

For goods of a loose and spready character, a known method is to measure approximately the main quantity in a measuring box and make the final adjustment on a balance. In this case, the measuring and weighing processes are entirely distinct from each other. Even where a combination of the measuring and weighing processes represents the most advanced technical achievement, as for instance in the case of powder filling machines, a distinction is also made between the measuring device and the balance.

The present invention solves the problem of increasing the accuracy of the measurement obtained with the measuring device and, in accordance with the invention, the measurement is checked or controlled by weighing, whereby the weighing takes place while the goods are still contained in the measuring device. In the illustrated construction, the means of weighing are combined with the measuring device.

The invention is characterized as an apparatus for weighing materials to be filled, in which, by delivering a quantity of goods corresponding to the rough weight onto the weighing dish of a balance, the refilling is not interrupted by the amount of the rough weight. As soon as the rough weight quantity is deposited on the balance, the elements of the balance are moved downwards (positively controlled), in arrested position. Not until the desired weight is reached, does the scale beam deflect and actuate a locking device at the same time, which arrests the downward movement and also prevents further deflection of the scale beam. The locking device may be equipped with a pawl or similar means. The same excess always remains in the measuring drum. The material to be filled is in constant flow and the connection of the main quantity of the measured goods with the refill quantity is not interrupted, which increases the accuracy of the measuring process as well as the output. The material present above the measuring box is weighed as surplus weight with the rest and, on closing the measuring box, is removed by the pre-filling drum. Since the amount of material present above the measuring box is always very small and, in addition, can be regulated by means of the throttle valve arranged on the material feed branch, a constant excess weight is always ensured.

This feature of the invention is illustrated in the drawings wherein measuring apparatus which is characterized by a protective device in the form of a balance is arranged below the measuring box for stopping the change in volume of the measuring box in accordance with a specific weight of the material being measured.

The object of the invention is illustrated by example in the accompanying drawings.

Fig. 1 is an elevation of such a measuring device with parts in section and with the weighing scale or balance omitted.

Fig. 2 is a section on line 2—2 of Fig. 1 on an enlarged scale with closed drum for the material to be filled.

Fig. 3 is a view similar to Fig. 2 with the exception that the drum is open.

Fig. 4 is an elevation of the measuring device with parts shown in section and with the upper portion broken away and also illustrated weighing means associated with the device.

Fig. 5 is a diagrammatic plan view of details of the balance.

With reference to Figs. 1 to 3, wherein one embodiment of filling and measuring means employed with the device are illustrated, a cylinder having its longitudinal axis inclined to the vertical is indicated by reference numeral 1. As illustrated at 2, the upper portion of cylinder 1 is provided with an angularly disposed extension and a sliding cylinder 3 is mounted inside said upper portion to assist in regulating the pressure of the material to be filled. In the lower portion of cylinder 1, a supporting bottom 4 is provided which leaves a passage free in the cross section of the cylinder. As shown in Fig. 1, a swinging disc 5 serves to agitate the flow of the material. An outlet branch 6 at the bottom of cylinder 1 and angularly disposed thereto, communicates with a measuring receptacle and relieves the latter from the pressure of the material deposited above it.

The outlet end of branch 6 opens directly into an open ended drum 8 which is mounted within a prefilling chamber 100 having a wall that partially surrounds the branch 6 and assists in supporting the cylinder 1. Drum 8 is rotatably mounted within the chamber 100 for turning movement about a horizontal axis and is provided with an opening or discharge outlet 101 adapted to be brought into registration with an opening in the bottom of the pre-filling chamber which communicates with the measuring box of the device. In Fig. 2, the drum 8 is shown in a position to close off the chamber 100 from a measuring box 9 used with the device while in Fig. 3 the drum has been turned to bring the discharge opening therein into registration with the top of the measuring box. Drum 8 may be periodically turned to align its discharge opening with the measuring box and then turned to a position to cut off access to the box whereby to control the flow of the material undergoing measurement.

A sleeve 7, slidably mounted on the branch 6, serves to regulate the discharge of material from the branch and into the drum 8 in accordance with the position of the sleeve on the branch. Sleeve 7 is shown in an extended position with respect to the branch 6 by the dotted lines in Fig. 2. The discharge opening in the drum 8 may be brought into registration with a suitable hand hole in the wall of the prefilling chamber 100 to permit adjustment of the sleeve 7. Instead of using a sleeve to control the flow of material, a throttle valve which is pivoted on the branch may be employed to control the flow of material into the drum 8. This later type of construction is illustrated in connection with Fig. 4.

The measuring box 9 shown with the filling and measuring means of Figs. 2 and 3 has its wall formed of flexible band material such as a band spring. This spring is wound in overlapping spirals and has one of its ends secured to the wall of the prefilling chamber 100 around the outlet portion of the chamber. The other end of the spring may be fixed within a retaining ring which is adapted to be supported on the pan or scale dish of a balance such as that shown in use with the apparatus to be described in connection with Fig. 4 but omitted from Figs. 2 and 3. It will be appreciated that this construction provides a flexible wall of conical shape for the measuring box 9 as well as a wall formed of telescoping sections which may be readily collapsed or extended to vary the depth as well as the mean diameter of the box and consequently the volume of the box.

It has been heretofore noted that the invention contemplates the use of a weighing scale or balance with the filling and measuring means for the purpose of increasing the accuracy of measurement of the device. By way of illustrating this concept, Fig. 4 shows the use of a preferred form of weighing scale with filling and measuring means comprising elements such as a prefilling chamber 110, branch discharge conduit 11 and rotatable drum 13 all similar to the corresponding parts in Figs. 2 and 3 and similarly assembled.

However, instead of using the sliding sleeve 7 of Figs. 2 and 3 to regulate the discharge from the branch conduit, the construction of Fig. 4 is shown as employing a swinging throttle valve 12 of the type previously mentioned. This valve 12 partially surrounds the lower end of the discharge branch 11 and is pivotally mounted as indicated in the drawings. Regulation of the flow of material from the discharge branch 11 into drum 13 will be in accordance with the position of the valve 12 which may be turned about its pivot by any suitable means.

In Fig. 4 the walls of the measuring box are formed of ring sections 15 and 16. The lower section 16 is supported upon the scale dish of the balance employed with the filling and measuring device.

With reference to the scale means of Figs. 4 and 5, the scale dish 41 thereof has a hinged bottom 18 swinging around an axis 17, which, in accordance with the working rhythm of the machine, is released from time to time and caught again by a catch 20 swinging around a bolt 19. The scale beam is indicated by reference numeral 21.

As an example, the balance is executed as a lever balance with the counterpoise 22. The scale beam has seats 23, in which the edges 24 of the weighing dish rest. In addition, the scale beam rests with its edges 25 on the seats 26, which are arranged on the parallel guide means and are provided in the levers 27. As can be seen, the scale beam 21 is bow shaped. The parallel guide consists of a joint quadrangle 27, 28, 29 and 30, whereby part 30 slides on a rail 31 and thus the entire mechanism of the balance is adjustable as to height together with the lower part 16 of the measuring box.

The lever connection 32, 33, which is joined to part 27, acts as check link means and serves for the straight-line motion of the weighing dish 41. The scale beam also has a stop 34 which rests on an extension of the lever 28 until the balance begins to deflect. A driving lever 35 controls the upward and downward movement of the lever mechanism of the balance. A cam 36 is provided on the scale beam 21 and actuates a pawl 38 swinging around a pivot 37 of the lever 27, said pawl then engaging with a rack 39 when the balance deflects downward upon reaching the desired filling weight.

As can be seen from the drawings, the measured goods are delivered in a constant flow from the material feed 11, throttled by the valve 12, into the storing drum 13 and from there through the opening 14 to the measuring box comprising the ring section 15 and 16. After about two-thirds of the measured quantity has entered the measuring box, the scale dish 41 begins to move downward together with the entire balance and continues to do so until the weight which is to be measured and weighed is reached. The downward movement is controlled by the driving lever 35, which is actuated in accordance with the working rhythm of the machine. When the desired weight has been reached, the scale beam deflects and, as the result of engagement of the pawl 38 with the rack 39 by means of the cam 36 on the scale beam 21, prevents further downward movement of the scales. Regardless of this, the driving lever 35 continues on its path. The remainder of the material to be filled, designated as 40, above the measuring box is weighed as surplus weight at the same time, as already mentioned, and is removed, on clogging the measuring box, by means of the pre-filling drum. The amount of material present above the measuring box is always a very small quantity and, if need be, can be regulated by the throttle valve 12.

From the foregoing, it will be appreciated that the combination of the measuring means and balance which have been disclosed together with the means providing for the maintenance of a constant flow of the material to be measured, result in a highly efficient and accurate device.

I claim:

1. A weighing device having a scale beam, a scale dish pivoted on the beam, a variable volume measuring box through which material to be weighed is transmitted to said dish, said box having a vertically movable portion the position of which determines the volume of the box and one end of which is supported on said dish for movement therewith, lever means on which said scale beam is supported for vertical movement in accordance with the movement of said lever means about its pivot, a bracket on which said lever means is pivoted, stop means supported adjacent said lever means, and holding means on said lever means responsive to the swinging of the scale beam about its pivot to engage the stop means as the beam is depressed by weight on said dish to thereby limit the downward vertical movement of the beam.

2. A weighing device as claimed in claim 1 wherein the bracket on which the lever means is pivoted is vertically adjustable to permit variation in the extent of the downward vertical movement of the scale beam.

3. A weighing device comprising a scale beam provided with a scale dish which is pivoted on the beam, a measuring box having a vertically movable portion the position of which determines the volume of the box, the material to be weighed being transmitted to the scale dish through said box and the movable portion thereof supported on the scale dish, lever means on which the scale beam is supported whereby the beam and the dish may be moved substantially vertically on movement of the lever means about a pivot, a bracket on which said lever means is pivoted, a support, stop means on said support located adjacent the lever means, holding means movably mounted on said lever means and adapted to be engaged with said stop means to arrest the downward vertical movement of the scale beam, and cam means carried by the scale beam and movable therewith as the scale beam is depressed under the influence of weight on its dish for operating said holding means and moving the holding means into engagement with said stop means.

4. A weighing device as claimed in claim 3 wherein the bracket means to which the lever means is pivoted is vertically adjustable whereby to adjust the volume of the measuring box to accommodate a desired quantity of material to be weighed.

5. A weighing device as claimed in claim 3 wherein said stop means comprises a rack member and said bracket means to which the lever means is pivoted is vertically adjustable whereby to adjust the volume of the measuring box to accommodate a desired quantity of material to be weighed.

6. In a weighing device having a forked scale beam between the forks of which a scale dish is pivoted, the combination of an adjustably-mounted support, lever means fulcrumed on said support for mounting the scale beam and the dish for vertical movement in accordance with the movement of the lever means, said lever means comprising a pair of parallelogram supports to each of which a fork of the scale beam is pivoted, means for terminating the downward swinging movements of said scale beam and lever means, and check link means arranged between said scale beam and said lever means.

7. A weighing device as set forth in claim 6 wherein the means for terminating the swinging movements of the lever means and the scale means comprises a stop and a holding means, said holding means being carried by said lever means and responsive to the rocking movement of the scale beam under the influence of a weight on the scale dish to cooperate with said stop means to limit the extent of the vertical downward movement of the scale beam and the scale dish.

8. A weighing device as set forth in claim 6 wherein the rocking movement of the scale beam under the weight of material which is being weighed on the scale dish is utilized to operate the means for limiting the extent of the vertical downward movement of the scale beam and dish, said means comprising rack means positioned adjacent each parallelogram support, movable holding means carried by each parallelogram support for engagement with said rack means and cam means fixed on each fork of said scale means and brought into contact with the holding means on the parallelogram support with which the respective holding means are associated on downward movement of the scale beam by weight on the scale dish whereby to bring said holding means into operative engagement with the rack means.

ADOLF RAMBOLD.